(12) United States Patent
Niescier

(10) Patent No.: US 6,266,751 B1
(45) Date of Patent: Jul. 24, 2001

(54) CONTINUOUSLY SLIDING WINDOW METHOD AND APPARATUS FOR SHARING SINGLE-PORTED MEMORY BANKS BETWEEN TWO AGENTS

(75) Inventor: Richard J. Niescier, Bethlehem, PA (US)

(73) Assignee: Agere Systems Guardin Corp., Miami Lakes, FL (US)

(*) Notice: Subject to any disclaimer, the term of this patent is extended or adjusted under 35 U.S.C. 154(b) by 0 days.

(21) Appl. No.: 09/141,510

(22) Filed: Aug. 27, 1998

Related U.S. Application Data
(60) Provisional application No. 60/065,855, filed on Nov. 14, 1997.

(51) Int. Cl.⁷ ........................................... G06F 12/00
(52) U.S. Cl. ..................... 711/173; 711/147; 711/151; 711/173; 711/170
(58) Field of Search ................... 711/5, 147, 148, 711/158, 151, 202, 153, 170, 171, 172, 173

(56) References Cited

U.S. PATENT DOCUMENTS

| | | | |
|---|---|---|---|
| 5,265,053 | * 11/1993 | Naradone et al. .................. 365/193 |
| 5,737,563 | * 4/1998 | Shigeeda .............................. 711/5 |
| 5,761,726 | * 6/1998 | Guttag et al. ...................... 711/147 |
| 5,805,854 | * 9/1998 | Shigeeda ............................ 365/201 |
| 5,835,926 | * 11/1998 | Pesuit ................................... 711/1 |
| 6,023,281 | * 2/2000 | Grigor et al. ..................... 345/512 |
| 6,026,465 | * 2/2000 | Mills et al. ....................... 711/103 |

* cited by examiner

*Primary Examiner*—Matthew Kim
*Assistant Examiner*—Christian P. Chace
(74) *Attorney, Agent, or Firm*—William H. Bollman

(57) ABSTRACT

A shared memory system configurably partitioned to assign a pre-defined number of memory banks to a first processing agent and the remaining memory banks to a second processing agent. The first group of memory banks is assigned into the memory map of the first processing agent in increasing order while the second group of memory banks is assigned into the memory map of the second processing agent in decreasing order. In more general terms, in a shared memory bank system having M memory banks, a first processing agent will own memory banks 1 through N starting at its address 0, and a second processing agent will own memory banks M to N+1, respectively, starting at its address 0.

34 Claims, 8 Drawing Sheets

FIG. 3A

AGENT #1
MEMORY TABLE

| | |
|---|---|
| 7K | MEM. BANK #7 |
| 6K | MEM. BANK #6 |
| 5K | MEM. BANK #5 |
| 4K | MEM. BANK #4 |
| 3K | MEM. BANK #3 |
| 2K | MEM. BANK #2 |
| 1K | MEM. BANK #1 |
| 0 | |

FIG. 3B

AGENT #2
MEMORY TABLE

| | |
|---|---|
| 7K | MEM. BANK #8 |
| 6K | MEM. BANK #9 |
| 5K | MEM. BANK #10 |
| 4K | MEM. BANK #11 |
| 3K | MEM. BANK #12 |
| 2K | MEM. BANK #13 |
| 1K | MEM. BANK #14 |
| 0 | |

FIG. 4A

AGENT #1
MEMORY TABLE

| | |
|---|---|
| 5K | MEM. BANK #5 |
| 4K | MEM. BANK #4 |
| 3K | MEM. BANK #3 |
| 2K | MEM. BANK #2 |
| 1K | MEM. BANK #1 |
| 0 | |

FIG. 4B

AGENT #2
MEMORY TABLE

| | |
|---|---|
| 9K | MEM. BANK #6 |
| 8K | MEM. BANK #7 |
| 7K | MEM. BANK #8 |
| 6K | MEM. BANK #9 |
| 5K | MEM. BANK #10 |
| 4K | MEM. BANK #11 |
| 3K | MEM. BANK #12 |
| 2K | MEM. BANK #13 |
| 1K | MEM. BANK #14 |
| 0 | |

FIG. 5A

AGENT #1
MEMORY TABLE

| Address | Bank |
|---|---|
| 8K–9K | MEM. BANK #9 |
| 7K–8K | MEM. BANK #8 |
| 6K–7K | MEM. BANK #7 |
| 5K–6K | MEM. BANK #6 |
| 4K–5K | MEM. BANK #5 |
| 3K–4K | MEM. BANK #4 |
| 2K–3K | MEM. BANK #3 |
| 1K–2K | MEM. BANK #2 |
| 0–1K | MEM. BANK #1 |

FIG. 5B

AGENT #2
MEMORY TABLE

| Address | Bank |
|---|---|
| 4K–5K | MEM. BANK #10 |
| 3K–4K | MEM. BANK #11 |
| 2K–3K | MEM. BANK #12 |
| 1K–2K | MEM. BANK #13 |
| 0–1K | MEM. BANK #14 |

FIG. 6
PRIOR ART
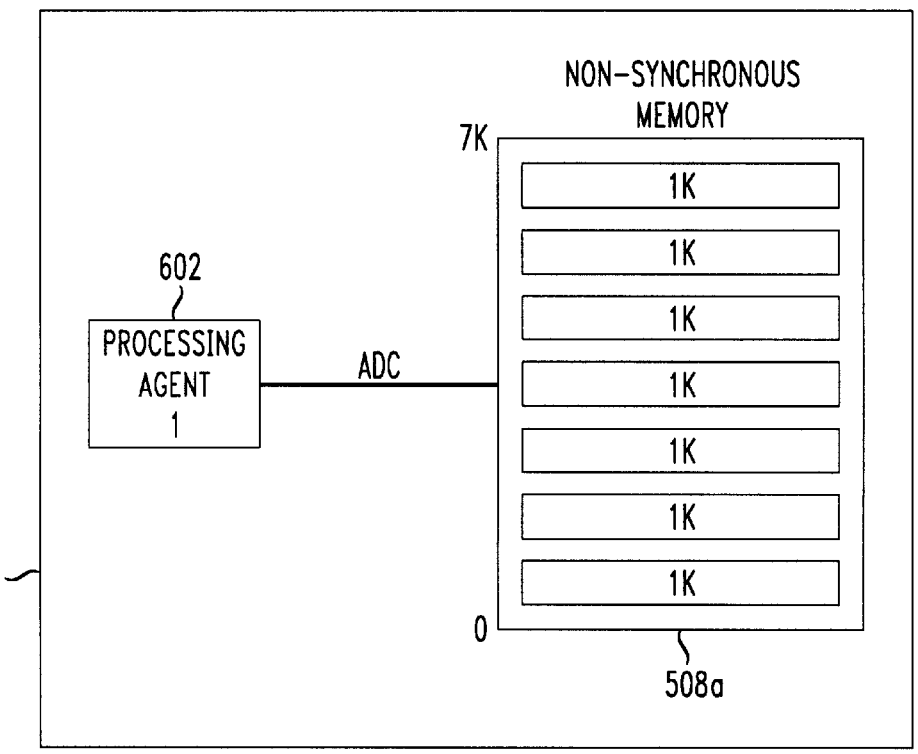
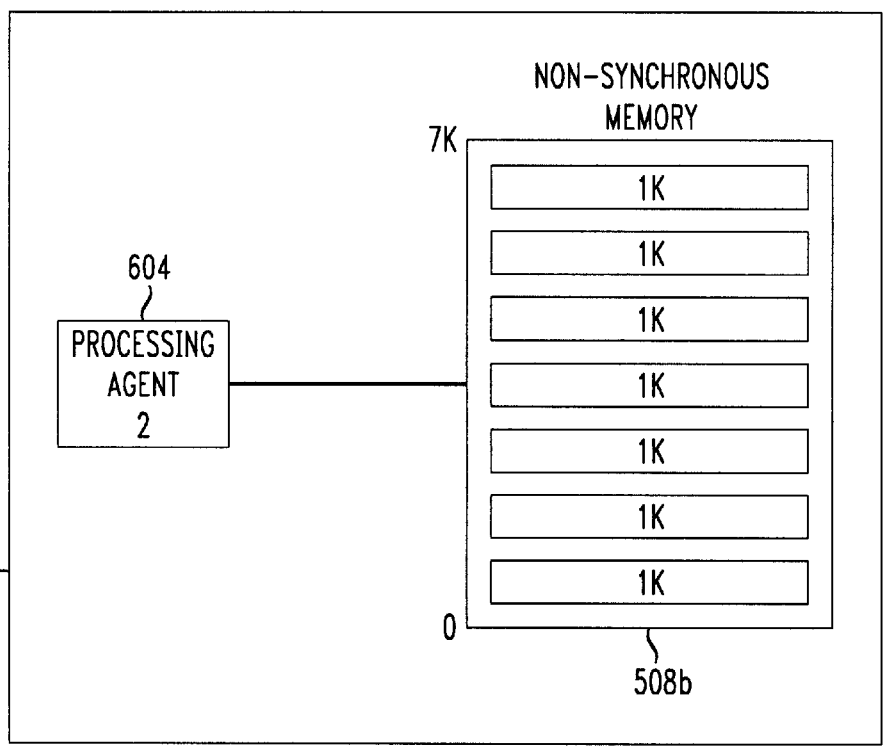

CONTINUOUSLY SLIDING WINDOW METHOD AND APPARATUS FOR SHARING SINGLE-PORTED MEMORY BANKS BETWEEN TWO AGENTS

This application claims priority from U.S. Provisional Application No. 60/065,855 entitled "Multipurpose Digital Signal Processing System" filed on Nov. 14, 1997, the specification of which is hereby expressly incorporated herein.

BACKGROUND OF THE INVENTION

1. Field of the Invention

This invention relates generally to the shared usage of memory by a plurality of processing agents. In particular, it relates to the efficient and flexible partitioning of shared single-ported memory between a plurality of processing agents.

2. Background of Related Art

With the ever-increasing speeds of today's processors, memory designs have attempted to meet the required speed requirements. Moreover, with the ever-increasing integration of more than one specific task oriented processor for use in a single system, the efficient utilization of fast memory has become a design challenge.

For instance, to achieve fast memory speeds, synchronous dynamic random access memory (SDRAM) technology has been developed for a wide variety of applications to close the gap between the needs of high-speed processors and the access time of non-synchronous memory such as dynamic random access memory (DRAM) or static random access memory (SRAM). Synchronous memory, e.g., SDRAM technology, combines industry advances in fast dynamic random access memory (DRAM) with a high-speed interface.

Functionally, an SDRAM resembles a conventional DRAM, i.e., it is dynamic and must be refreshed. However, the SDRAM architecture has improvements over standard DRAMs. For instance, an SDRAM uses internal pipelining to improve throughput and on-chip interleaving between separate memory banks to eliminate gaps in output data.

The idea of using a SDRAM synchronously (as opposed to using a DRAM asynchronously) emerged in light of increasing data transfer demands of high-end processors. SDRAM circuit designs are based on state machine operation instead of being level/pulse width driven as in conventional asynchronous memory devices. In addition, synchronous memory access techniques improve the margin to system noise because inputs are not level driven. Instead, the inputs are latched by the system clock. Since all timing is based on the same synchronous clock, designers can achieve better specification margins. Moreover, since the SDRAM access is programmable, designers can improve bus utilization because the processor can be synchronized to the SDRAM output.

The core of an SDRAM device is a standard DRAM with the important addition of synchronous control logic. By synchronizing all address, data and control signals with a single clock signal, SDRAM technology enhances performance, simplifies design and provides faster data transfer.

Synchronous memory requires a clock signal from the accessing agent to allow fully synchronous operation with respect to the accessing agent. If more than one agent is given access to a shared synchronous memory, each agent must conventionally supply its own clock signal to the synchronous memory. Unfortunately, the clock signals from separate agents are not conventionally synchronous or in phase with one another. Therefore, as the synchronous memory shifts from the use of one clock signal to another, delays or wait states must be added before the new agent's clock signal can be used to access the synchronous memory.

Some synchronous memory devices have the capability to provide burst input/output (I/O), particularly for the optimization of cache memory fills at the system frequency. Advanced features such as programmable burst mode and burst length improve memory system performance and flexibility in conventional synchronous memories, and eliminate the need to insert wait states, e.g., dormant clock cycles, between individual accesses in the burst.

Conventional SDRAM devices include independent, fixed memory sections that can be accessed individually or in an interleaved fashion. For instance, two independent banks in an SDRAM device allow that device to have two different rows active at the same time. This means that data can be read from or written to one bank while the other bank is being precharged. The setup normally associated with precharging and activating a row can be hidden by interleaving the bank accesses.

Conventionally, each task oriented processing agent had been provided with its own dedicated memory bank system, e.g., as shown in FIG. 6. FIG. 6 shows two separate processing agent systems 600a, 600b each having a processing agent 602, 604 and a dedicated memory bank system 508a, 508b, respectively. Each processing agent 602, 604 may be a suitable processor, e.g., a microprocessor, a microcontroller, or a digital signal processor (DSP).

Unfortunately, for applications wherein one processing agent requires significant amounts of information from another processing agent, significant delays were caused in transferring the information between the memory bank system of the first processing agent and the memory bank system of the second processing agent to allow the second processing agent to co-process information along with the first processing agent. To reduce the need for transferring information between non-synchronous memory bank systems, shared use of conventional non-synchronous memory using an arbitrator was developed, e.g., as shown in FIG. 7.

In particular, FIG. 7 shows a common single-ported memory bank system 508 being accessed by two processing agents 502, 504. A multiplexer (MUX) 510 passes the address, data and control busses (ADC) of a selected processing agent 502, 504 to the common single-ported memory bank system 508 under the control of an arbiter or arbitrator 512.

As may be appreciated, memory accesses by the separate agents 502, 504 would clash unless they are arbitrated to allow only one agent to access the common single-ported memory bank system 508 at any one time. Thus, selection logic (i.e., an arbitrator 512) is conventionally provided to control the multiplexer 510, which presents the appropriate address, data and control (ADC) signals to the common single-ported memory bank system 508. Typically, the processing agents 502, 504 are assigned a hierarchy in the arbitrator 512 for prioritized access to the common single-ported memory bank system 508, and the arbitrator 512 blocks out accesses by the other agents until finished accessing the common single-ported memory bank system 508.

Another conventional technique for sharing common single-ported non-asynchronous memory utilizes a memory management address translator 706 as shown in FIG. 8.

In particular, FIG. 8 shows two processing agents 702, 704 accessing a common single-ported memory bank system 508 under the control of a memory management address translator 706 and MUX 708. The address translation function serves to invisibly index the memory accesses by one of the processing agents 702, 704 up by a predetermined amount of memory, e.g., 7K as shown in FIG. 8. Thus, for instance, memory accesses to address 0 by the first processing agent 702 will index through the memory management address translator to a physical address 0 in the common single-ported memory bank system 508, and memory accesses to address 0 by the second processing agent 704 will index through the memory management address translator to an offset physical address, e.g., 7K in the common single-ported memory bank system 508.

Unfortunately, address translation is conventionally fixed in shared memory systems and does not provide flexibility in the changing memory needs of the processing agents, particularly as the agents are in operation.

Thus, there is a need for memory systems in general which adjust to the changing needs of a plurality of accessing agents.

SUMMARY OF THE INVENTION

In accordance with the principles of the present invention, a memory system comprises a plurality of contiguous memory banks collectively having a lowest addressable end and a highest addressable end. A switch is adapted and arranged to switch each of the plurality of contiguous memory banks for access from one of a first processing agent and a second processing agent. A control circuit assigns a first sub-plurality of the contiguous memory banks in increasing order from the lowest addressable end to a first memory map of the first processing agent, and assigns a second sub-plurality of the contiguous memory banks in decreasing order from the highest addressable end to a second memory map of the second processing agent.

A method of assigning a plurality of memory banks for shared use among a plurality of processing agents in accordance with the principles of the present invention includes providing a first processing agent access to a plurality of memory banks with a lower address of the first processing agent being associated with a last one of the plurality of memory banks and a higher address of the first processing agent being associated with a last one of the plurality of memory banks. A second processing agent is provided access to the plurality of memory banks with a lower address of the second processing agent being associated with the last one of the plurality of memory banks and a higher address of the second processing agent being associated with a first one of the plurality of memory banks.

In another aspect of the present invention, a method of assigning a plurality of shared memory banks to two agents comprises assigning a plurality of shared memory banks in increasing order to a memory map of a first agent. The plurality of shared memory banks are also assigned in decreasing order to a memory map of a second agent.

In yet another aspect of the present invention, a method of assigning a plurality of shared memory banks to two agents comprises assigning a plurality of shared memory banks in opposing order to each of two processing agents.

BRIEF DESCRIPTION OF THE DRAWINGS

Features and advantages of the present invention will become apparent to those skilled in the art from the following description with reference to the drawings, in which:

FIGS. 3A and 3B show a first example of a plurality of memory banks assigned for access by two agents in opposing order in accordance with the principles of the present invention.

FIGS. 4A and 4B show a second example of a plurality of memory banks assigned for access by two agents in opposing order in accordance with the principles of the present invention.

FIGS. 5A and 5B show a third example of a plurality of memory banks assigned for access by two agents in opposing order in accordance with the principles of the present invention.

FIG. 6 shows a conventional two agent system having separate non-synchronous memory systems.

DETAILED DESCRIPTION OF ILLUSTRATIVE EMBODIMENTS

Figure 1:
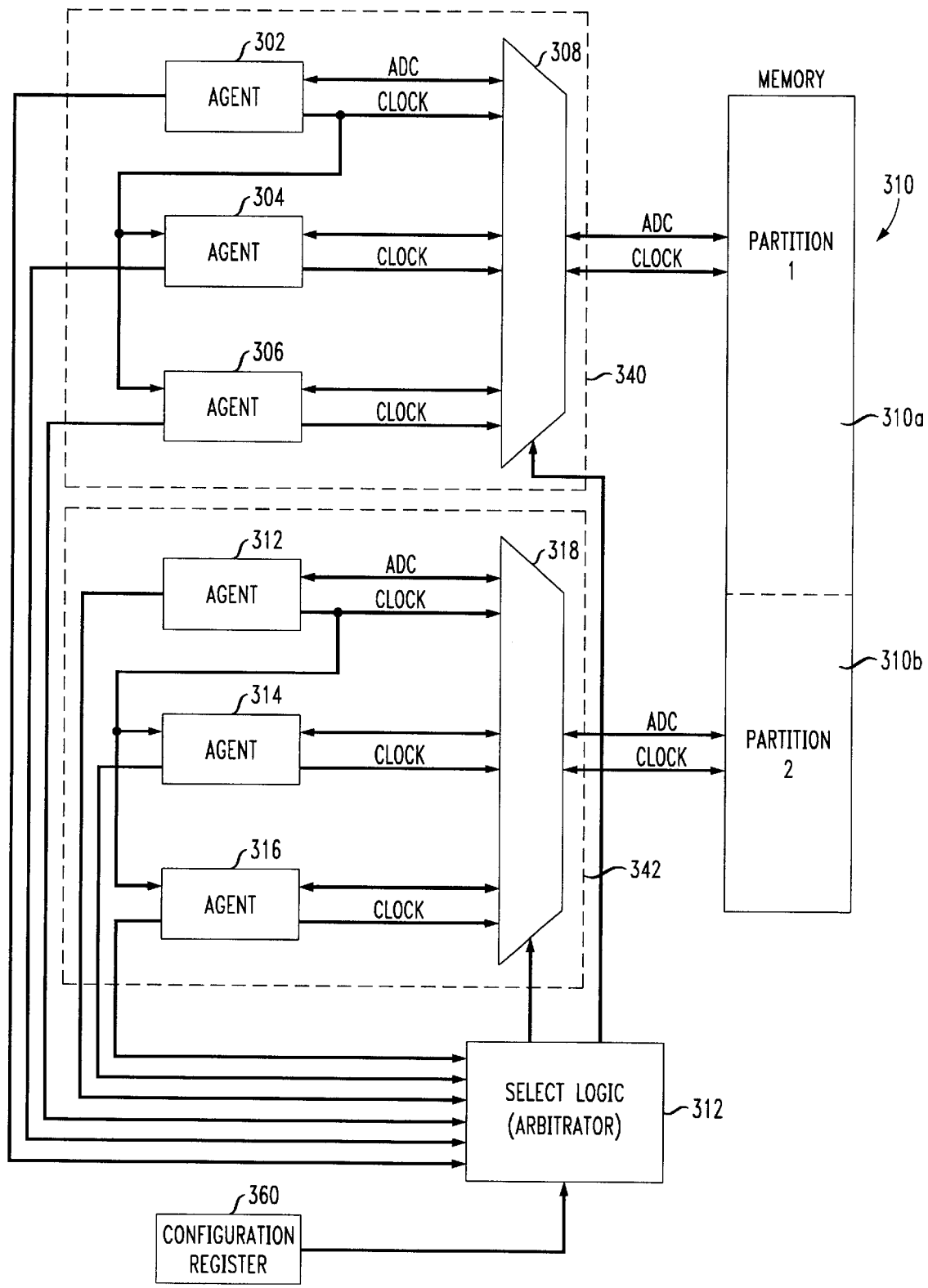
FIG. 1 shows a shared memory configurably partitioned to assign a pre-defined number of memory banks to each accessing agent.
Figure 2:
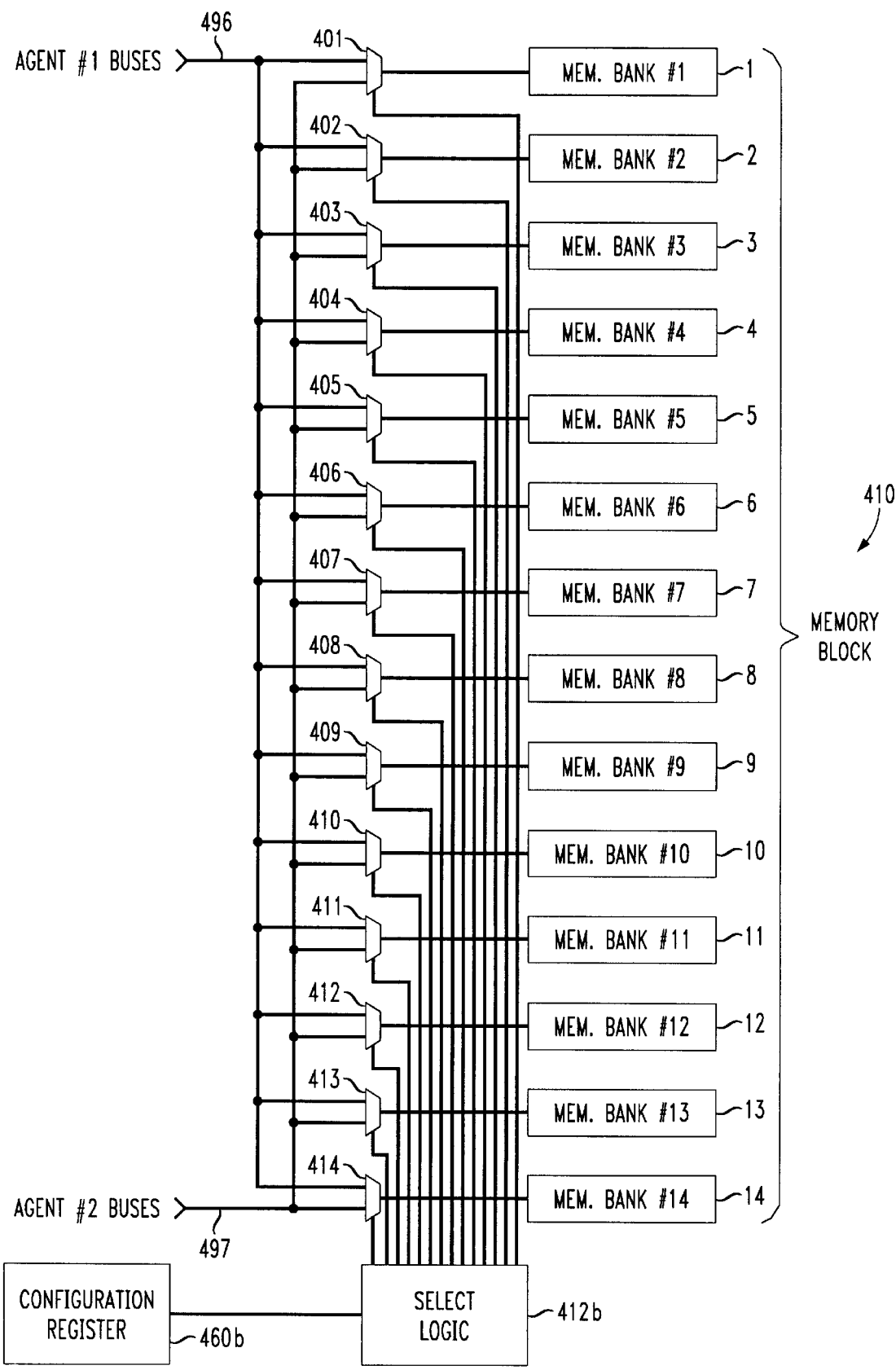
FIG. 2 shows one embodiment of the partitionable memory system shown in FIG. 1.
Figure 7:
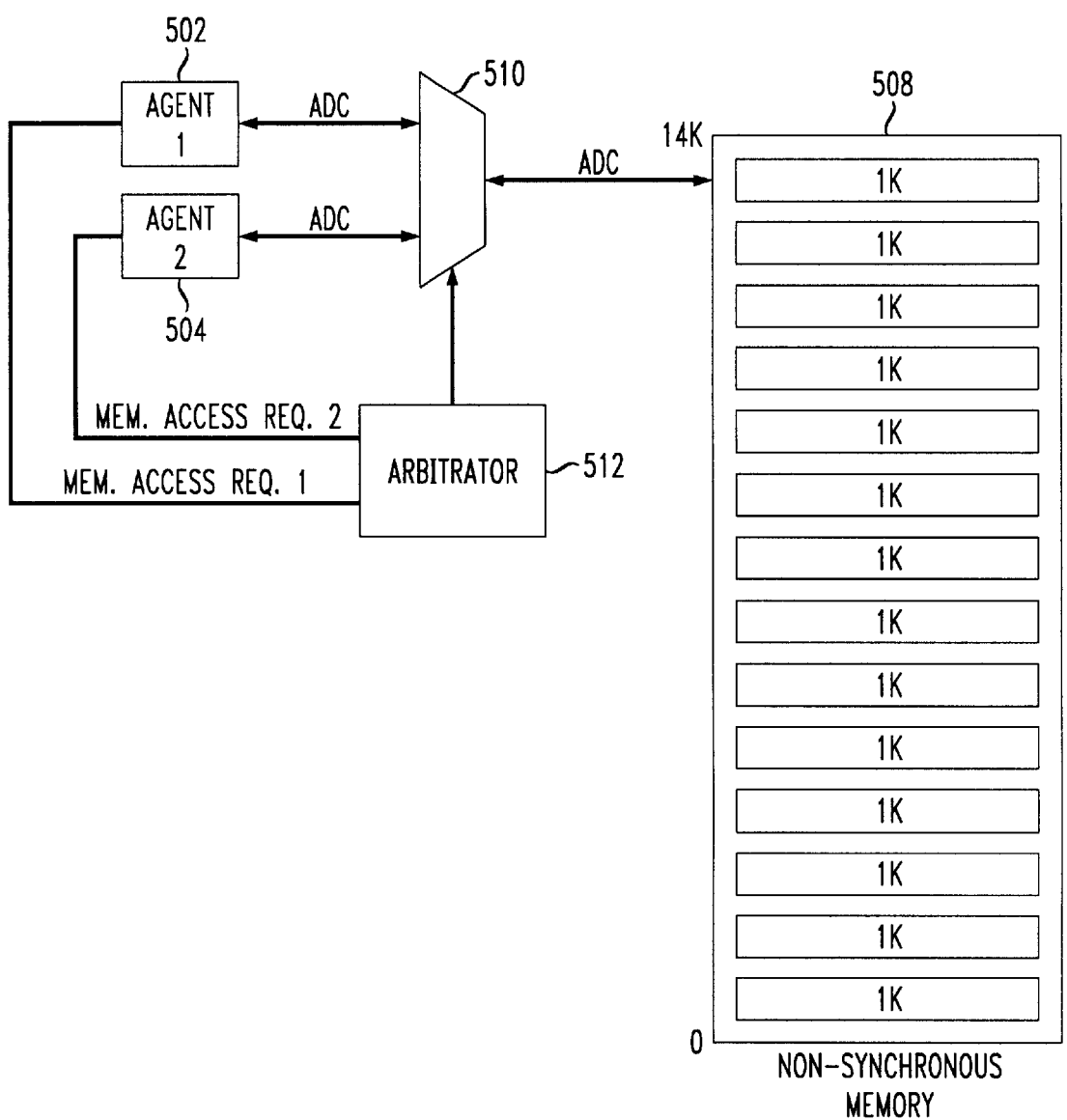
FIG. 7 shows a conventional two agent system utilizing an arbitrator for access to a shared non-synchronous memory.
Figure 8:
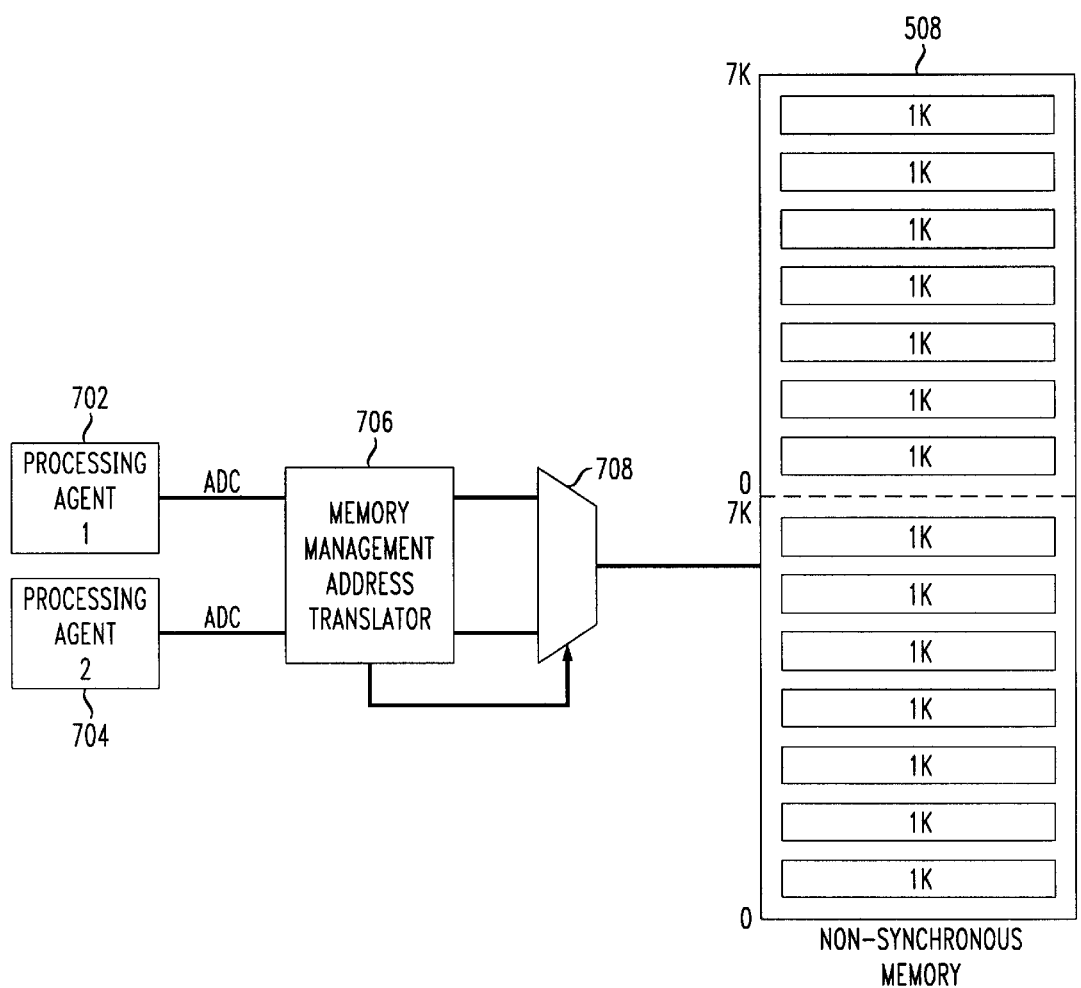
FIG. 8 shows a conventional two agent system utilizing a memory management address translator to offset memory accesses from one of the agents.

FIGS. 1 and 2 show a single-ported memory system including a plurality of memory blocks accessible by two separate agents or groups of processing agents. The present invention relates to the assignment of a plurality of shared memory blocks between two agents.

In particular, FIG. 1 shows a shared memory configurably partitioned to assign a pre-defined number of memory banks in a common memory system 310 to each accessing agent or group of agents. Although FIG. 1 shows synchronous memory 310, the present invention is also applicable to the use of shared non-synchronous memory, i.e., conventional memory such as dynamic random access memory (DRAM) or static random access memory (SRAM).

The embodiment of FIG. 1 is shown with respect to two groups of accessing agents, i.e., a first group of shared memory accessing agents 340 including processing agents 302–306, and a second group of shared memory accessing agents 342 including processing agents 312–316. Although the agent groups 340, 342 are shown with an equal number of agents, the present invention is equally applicable to groups of accessing agents having any number of agents.

The memory block 310 is configurably partitioned into a corresponding number of partitions 310a, 310b. Although the embodiment is shown with two partitions 310a, 310b, the invention is equally applicable to any number of partitions. Preferably, the number of partitions will equal the number of agent groups.

The separate agent groups 340, 342 access respectively partitioned portions of the shared memory 310. The partitions 310a, 310b may be any size, from zero to the entire memory block 310, as set in a configuration register 360.

In accordance with the principles of the present invention, the assignment of the memory banks in the memory block 310 is flexible, allowing any or all of the memory banks in the memory block 310 to be assigned to either of the agent groups 340, 342. With the configurability as disclosed, the user can change the memory configuration either before operating the processing agents 302–306, 312–316 or on-the-fly by executing certain instructions in the code to change the value in the configuration register 360.

The configuration register 360 can be written to by any of the agents 302, 304, 306, 312, 314 or 316. In the disclosed embodiment, the value written to the configuration register 360 corresponds to the length of the first partition 310a, with the remaining memory banks being assigned to the second partition.

Of course, multiple words or registers may be implemented within the configuration register 360 to accommodate more than two configurable partitions in the shared memory block 310 in accordance with the principles of the present invention.

It is preferred (but not required) that the memory block 310 be partitionable into contiguous partitions. For instance, if the configuration register 360 comprises one, four-bit register, it may adequately represent partitions between any of up to sixteen memory banks.

For example, assume for the purpose of explanation that there are fourteen memory banks in the memory block 310. If any of the agents 302, 304, 306, 312, 314 or 316 writes the value '9' (0101H) to the configuration register 360, this would be interpreted by the arbitrator 312 to partition the memory block 310 such that the first nine individual memory banks are to be assigned to the first agent group 340, and that the remaining five individual memory banks are to be assigned to the second agent group 342. The four bits of the configuration register 360 are then decoded by the arbitrator 312 to provide appropriate control signals to a first MUX 308 to select or deselect the requesting or winning agent in the first agent group 340 and to the second MUX 318 to select or deselect the requesting or winning agent in the second agent group 342. Because the memory block 310 is partitioned, both agent groups 340, 342 may access their respectively assigned partition 310a, 310b without conflict.

The memory bank arbitrator can also leave holes in the memory space as desired. For example, a first agent may be assigned memory banks 1, 2, 4, 6 and 8, while a second agent may be assigned memory banks 14–9, 7, 5 and 3.

In a multiple agent system, one shared memory block is often provided for use by all agents in the system. For various reasons, e.g., vastly differing application programs in each of the agents for any one user, a fixed amount of memory for each agent in the system may be inefficient. For instance, if one user implements code in only one of two available DSPs in an integrated circuit comprising a memory accessing system in accordance with the aspects of the present invention, then that user will have minimal if any memory requirement for the second DSP. In that case, it might be desirable to assign Or partition all available shared memory to the first DSP and no memory to the second DSP.

FIG. 2 shows a memory system 410 comprising a plurality of individual memory banks 1 to 14 which can be assigned for access either by a first agent bus 496 or a second agent bus 497. The memory banks 1 to 14 may be either synchronous (e.g., SDRAM) memory or non-synchronous (e.g., DRAM) memory. Moreover, although the embodiments of FIGS. 2 to 5B are shown with respect to fourteen individual memory banks, the invention is equally applicable to shared memory systems having any number of individual memory banks.

In accordance with the principles of the present invention, the memory banks 1 to 14 of a common memory system are flexibly assigned for access by two agent busses. The assignments are made in opposing directions from last to first and first to last memory bank, respectively.

Each individual memory bank 1 to 14 is configurably accessible by either agent through the use of suitable multiplexers 401 to 414. The MUXs 401 to 414 are individually controlled by selecting logic 412b, which effectively implements a flexible partition in the memory system 410 based on information set in a configuration register 460b.

The flexible partition may be moved during the operation of the memory system, but is preferably done so with confirmation by all affected agents. Thus, as one agent requires additional memory, the accessible memory for that agent can be increased, albeit at the expense of the available memory for the other agent.

Importantly, the present invention not only partitions the plurality of memory banks among the two agents, but assigns the memory banks in opposing order. FIGS. 3A through 5B depict exemplary assignments of the individual memory banks 1 to 14 into the memory map of the agent 1 (FIGS. 3A, 4A and 5A) and agent 2 (FIGS. 3B, 4B and 5B).

In accordance with the principles of the present invention, the first memory banks are assigned, preferably in order, into the memory map of the first agent as shown in FIG. 3A. Thus, if the memory system 410 is to be initially partitioned with seven memory banks accessible by the first agent and seven memory banks accessible by the second agent, then the first seven memory banks are assigned in increasing order into the memory map of the first agent as shown in FIG. 3A. However, as shown in FIG. 3B, the memory banks for the other agent are assigned in decreasing order, i.e., from highest to lowest, into the memory map of the second agent, from lowest to highest.

To further illustrate the invention, FIGS. 4A and 4B show an example assignment of the individual memory banks 1 to 14 with five memory banks assigned to the first agent and nine memory banks assigned to the second agent. In accordance with the principles of the present invention, the lowest memory banks are assigned to the first agent in increasing order starting with the lowest memory bank, e.g., memory bank #1, while the highest memory banks are assigned to the second agent in decreasing order starting with the highest memory bank, e.g., memory bank #14.

Similarly, FIGS. 5A and 5B illustrate an example mapping of the memory banks 1 to 14 wherein the first agent is initially assigned use of the nine lowest memory banks, i.e., memory banks #1 to #9 in order, while the second agent is assigned use of the five highest memory banks, i.e., memory banks #14 to #10 in order.

Accordingly, the present invention results in memory banks being addressed differently from the two agents. Nevertheless, by simply changing the position of the partition between the memory banks, data stored in a memory bank by a first agent can be accessed by the other agent.

The present invention has numerous applications. For instance, in a two DSP system, the first DSP may be running a modem application program requiring at least seven memory banks while the second DSP may be running a medium quality audio session requiring the balance of another seven memory banks. In this case, the configuration register may be set to, e.g., a '7' (0111H) to indicate the assignment of the first seven memory banks 1–7 in order from lowest to highest to the first DSP and the remaining seven memory banks 14–8 in order from highest to lowest to the second DSP. Then, at a later point in time, the user may run a high quality audio session at the second DSP which requires 12 memory banks. Either the first or second DSP can adjust the setting in the configuration register 460 to appropriate more memory banks to the second DSP, albeit at the expense of the size of the memory partition for the first DSP. For instance, in this case, a value of '2' (0010H) may be written to the configuration register 460 to assign two memory banks 1, 2 to the first DSP leaving the remaining twelve memory banks 14–3 in the second partition of the memory block for use by the second DSP. Conversely, the user may at another point in time wish to run a higher baud rate modem program on the first DSP requiring a larger amount of memory. In this case, the configuration register may be written to, e.g., to assign the first eleven memory banks 1–11 to the first DSP leaving only the remaining three memory banks 14–12 for use by the second DSP.

Thus, according to the principles of the present invention, two processing agents can access a shared-memory subsystem within a contiguous memory space without modifying the way in which the two processing agents address that memory space, i.e., memory management block, and without the need to arbitrate to gain access to the memory.

Accordingly, either processing agent can use a portion or all of the memory system without modifying the perceived memory space of the other processing agent.

In more general terms, in a shared memory bank system having M memory banks, a first processing agent will own memory banks 1 through N and a second processing agent will own memory banks N+1 to M. From the perspective of the first processing agent, address zero is located in the first memory bank 1, and the addresses increase with increasing memory bank numbers. From the perspective of the second processing agent, address zero is located in the highest memory bank M and its addresses increase with decreasing memory bank numbers. This is in the case of a contiguous memory requirement. Of course, the memory bank assignments do not necessarily have to be contiguous.

Therefore, in accordance with the principles of the present invention, data can be exchanged simply between two processing agents or separately arbitrated groups of processing agents. For instance, data can be written into a memory bank by a first processing agent, and then that memory bank can be simply switched into the domain of the second processing agent by appropriate switching of multiplexers controlling the input to that memory bank to allow the second processing agent full access to the data.

While the invention has been described with reference to the exemplary embodiments thereof, those skilled in the art will be able to make various modifications to the described embodiments of the invention without departing from the true spirit and scope of the invention.

What is claimed is:

1. A memory system comprising:
   a plurality of memory banks collectively having a lowest addressable end and a highest addressable end;
   a control module to assign a first sub-plurality of said memory banks in increasing order from said lowest addressable end to a first memory map of a first processing agent, and to assign a second sub-plurality of said memory banks in decreasing order from said highest addressable end to a second memory map of a second processing agent.

2. The memory system according to claim 1, wherein:
   said plurality of memory banks are contiguous.

3. The memory system according to claim 1, further comprising:
   a switch adapted and arranged to switch each of said plurality of memory banks for access from one of said first processing agent and said second processing agent.

4. The memory system according to claim 1, wherein said control module comprises:
   a configuration register to define said first sub-plurality of said memory banks and said second sub-plurality of said memory banks.

5. The memory system according to claim 1, wherein:
   said plurality of memory banks are assigned to only one of said first processing agent and said second processing agent at any one time.

6. The memory system according to claim 1, wherein:
   said plurality of memory banks are synchronous memory banks.

7. The memory system according to claim 1, wherein:
   said plurality of memory banks are asynchronous memory banks.

8. A method of assigning a plurality of memory banks for shared use among a plurality of processing agents, said method comprising:
   providing a first processing agent access to a plurality of memory banks having a sequence from a first one to a last one, with a lower address of said first processing agent being associated with said last one of said plurality of memory banks and a higher address of said first processing agent being associated with a memory bank between said last one of said plurality of memory banks and a first one of said plurality of memory banks; and
   providing a second processing agent access to said plurality of memory banks with a lower address of said second processing agent being associated with said first one of said plurality of memory banks and a higher address of said second processing agent being associated with a memory bank between said last one of said plurality of memory banks and said first one of said plurality of memory banks.

9. The method of assigning a plurality of memory banks for shared use among a plurality of processing agents according to claim 8, wherein:
   said first one of said plurality of memory banks is associated with address zero in a memory map of said first processing agent.

10. The method of assigning a plurality of memory banks for shared use among a plurality of processing agents according to claim 8, wherein:
    said last one of said plurality of memory banks is associated with address zero in a memory map of said second processing agent.

11. The method of assigning a plurality of memory banks for shared use among a plurality of processing agents according to claim 9, wherein:
    said last one of said plurality of memory banks is associated with address zero in a memory map of said second processing agent.

12. The method of assigning a plurality of memory banks for shared use among a plurality of processing agents according to claim 9, wherein:
    said plurality of memory banks are synchronous memory.

13. The method of assigning a plurality of memory banks for shared use among a plurality of processing agents according to claim 9, wherein:
    said plurality of memory banks are asynchronous memory.

14. The method of assigning a plurality of memory banks for shared use among a plurality of processing agents according to claim 9, wherein:
    each of said plurality of memory banks are not substantially simultaneously accessible by both said first processing agent and said second processing agent.

15. A method of assigning a plurality of shared memory banks to two agents, comprising:

assigning a plurality of shared memory banks in increasing order to a memory map of a first agent; and assigning said plurality of shared memory banks in decreasing order to a memory map of a second agent.

16. The method of assigning a plurality of shared memory banks to two agents according to claim 15, wherein:

said plurality of shared memory banks are synchronous memory banks.

17. A method of assigning a plurality of shared memory banks to two agents, comprising:

assigning a plurality of shared memory banks in opposing order to each of two processing agents.

18. Apparatus for assigning a plurality of memory banks for shared use among a plurality of processing agents, comprising:

means for providing a first processing agent access to a plurality of memory banks with a lower address of said first processing agent being associated with a last one of said plurality of memory banks and a higher address of said first processing agent being associated with a memory bank between said last one of said plurality of memory banks and a first one of said plurality of memory banks; and means for providing a second processing agent access to said plurality of memory banks with a lower address of said second processing agent being associated with said first one of said plurality of memory banks and a higher address of said second processing agent being associated with a memory bank between said last one of said plurality of memory banks and said first one of said plurality of memory banks.

19. The apparatus for assigning a plurality of memory banks for shared use among a plurality of processing agents according to claim 18, wherein:

said first one of said plurality of memory banks is associated with address zero in a memory map of said first processing agent.

20. The apparatus for assigning a plurality of memory banks for shared use among a plurality of processing agents according to claim 18, wherein:

said last one of said plurality of memory banks is associated with address zero in a memory map of said second processing agent.

21. The apparatus for assigning a plurality of memory banks for shared use among a plurality of processing agents according to claim 20, wherein:

said last one of said plurality of memory banks is associated with address zero in a memory map of said second processing agent.

22. The apparatus for assigning a plurality of memory banks for snared use among a plurality of processing agents according to claim 18, wherein:

said memory is synchronous memory.

23. Apparatus for assigning a plurality of shared memory banks to two agents, comprising:

means for assigning a plurality of shared memory banks in increasing order to a memory map of a first agent; and means for assigning said plurality of shared memory banks in decreasing order to a memory map of a second agent.

24. The apparatus for assigning a plurality of shared memory banks to two agents according to claim 23, wherein:

said plurality of shared memory banks are synchronous memory banks.

25. A computer system, comprising:

a first processing agent;

a second processing agent;

a shared synchronous memory accessible by said first processing agent and by said second processing agent; and a control module to assign a first portion of said shared synchronous memory in increasing order from a lowest addressable end to a first memory map of said first processing agent, and to assign a second sub-plurality of said shared synchronous memory in decreasing order from a highest addressable end to a second memory map of said second processing agent.

26. An apparatus for assigning a plurality of memory banks in a common memory module for shared use among a plurality of processing agents, comprising:

a first group of processing agents;

a second group of processing agents;

a memory bank arbiter for assigning partitions to said processing agents on-the-fly, which include assigning portions of said memory banks to said first group of processing agents and assigning portions of said memory banks to said second group of processing agents;

wherein said memory bank arbiter assigns a first sub-plurality of memory banks in increasing order from a lowest addressable end to a first memory map of a first processing agent, and assigns a second sub-plurality of said memory banks in decreasing order from a highest addressable end to a second memory map of a second processing agent.

27. An apparatus for assigning a plurality of memory banks in a common memory module shared use among a plurality of processing agents, according to claim 26, wherein:

said first group of processing agents is equal in number of processing agents to said second group of processing agents.

28. An apparatus for assigning a plurality of memory banks in a common memory module shared use among a plurality of processing agents, according to claim 26, wherein:

said first group of processing agents is unequal in number of processing agents to said second group of processing agents.

29. An apparatus for assigning a plurality of memory banks in a common memory module shared use among a plurality of processing agents, according to claim 26, wherein:

said partitions can vary in number from one to a number equal to the total number of said memory banks.

30. An apparatus for assigning a plurality of memory banks in a common memory module shared use among a plurality of processing agents, according to claim 26, wherein:

said portions of memory banks are not all assigned to said first group of processing agents or to said second group of processing agents.

31. An apparatus for assigning a plurality of memory banks in a common memory module shared use among a plurality of processing agents, according to claim 26, wherein:

said portions of memory banks are assigned non-contiguously to said first group of processing agents and to said second group of processing agents.

32. An apparatus for assigning a plurality of memory banks in a common memory module shared use among a plurality of processing agents, according to claim 26, wherein:

said first group of processing agents and/or said second group of processing agents are comprised of a single processing agent.

33. An apparatus for assigning a plurality of memory banks in a common memory module shared use among a plurality of processing agents, according to claim 26, wherein:

said portions of memory banks are assigned in opposing direction from last to first and first to last to respective said first group of processing agents and said second group of processing agents.

34. An apparatus for assigning a plurality of memory banks in a common memory module shared use among a plurality of processing agents, according to claim 26, wherein:

said first group of processing agents and said second processing agents have access to the same said portions of memory banks.

\* \* \* \* \*